United States Patent
Hong et al.

(10) Patent No.: US 9,344,854 B2
(45) Date of Patent: May 17, 2016

(54) METHOD, STORAGE MEDIUM, SERVER, AND ELECTRONIC DEVICE FOR IMPLEMENTING LOCATION BASED SERVICE WITHIN BUILDING

(71) Applicants: Samsung Electronics Co., Ltd., Gyeonggi-do (KR); Korea Advanced Institute of Science and Technology, Daejeon (KR)

(72) Inventors: Hyun-Su Hong, Gyeonggi-do (KR); Jae-Myeon Lee, Gyeonggi-do (KR); Dong-Soo Han, Daejeon (KR); Choon-Oh Lee, Daejeon (KR); Han-Sung Lee, Seoul (KR); Suk-Hoon Jung, Daejeon (KR); Byeong-Cheol Moon, Daegu (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 0 days.

(21) Appl. No.: 14/309,231

(22) Filed: Jun. 19, 2014

(65) Prior Publication Data
US 2014/0378166 A1    Dec. 25, 2014

(30) Foreign Application Priority Data

Jun. 19, 2013    (KR) .......................... 10-2013-0070401

(51) Int. Cl.
*H04W 24/00*    (2009.01)
*H04W 4/04*    (2009.01)

(52) U.S. Cl.
CPC ....................................... *H04W 4/04* (2013.01)

(58) Field of Classification Search
CPC .................................. H04W 4/04; H04W 4/02
USPC ............ 455/456.3, 456.1, 404.2; 342/357.31, 342/357.2, 451
See application file for complete search history.

(56) References Cited

U.S. PATENT DOCUMENTS

| 8,933,841 B2* | 1/2015 | Valaee et al. ................... 342/451 |
| 9,014,718 B2* | 4/2015 | Yang et al. ................. 455/456.1 |
| 2006/0095349 A1 | 5/2006 | Morgan et al. |
| 2008/0004037 A1 | 1/2008 | Achlioptas et al. |
| 2010/0039929 A1 | 2/2010 | Cho et al. |
| 2010/0208711 A1 | 8/2010 | Georgis et al. |

FOREIGN PATENT DOCUMENTS

| KR | 1020080053116 | 6/2008 |
| KR | 1020120029976 | 3/2012 |

* cited by examiner

*Primary Examiner* — Amancio Gonzalez
(74) *Attorney, Agent, or Firm* — The Farrell Law Firm, P.C.

(57) ABSTRACT

A method of implementing a location-based service within a building is provided. The method includes receiving, from at least one electronic device, a plurality of data sets indicating information of wireless signals which the at least one electronic device measures for each time or for each location within the building; determining a similarity between the plurality of data sets; generating a logical path by integrating similar data sets; and generating a wireless signal map within the building by mapping the logical path to a physical path of the building.

21 Claims, 16 Drawing Sheets

METHOD, STORAGE MEDIUM, SERVER, AND ELECTRONIC DEVICE FOR IMPLEMENTING LOCATION BASED SERVICE WITHIN BUILDING

PRIORITY

This application claims priority under 35 U.S.C. §119(a) to Korean Patent Application Serial No. 10-2013-0070401, which was filed in the Korean Intellectual Property Office on Jun. 19, 2013, the entire content of which is incorporated herein by reference.

BACKGROUND

1. Field of the Invention

The present invention generally relates to a location-based service, and more particularly, to a method of building a database needed for implementing a location-based service, and a method of providing a service using the same.

2. Description of the Related Art

In order to recognize a location of an electronic device, a satellite-based system, such as a Global Positioning System (GPS), etc., is generally utilized outdoors. However, since a satellite signal is weak in the city or indoors, it is difficult to utilize such a system in these places. In this case, generally, a method, in which a database is built by collecting a Radio Frequency (RF) signal, such as a Wi-Fi signal, a cellular signal, etc., from each area, and a location is recognized by comparing an RF signal measured by the electronic device with the database, is utilized.

Reference location information is required for building the RF signal database. The database is completed by integrally recording location information serving as a reference and RF signal measurement data, at each point where the database is desired to be built.

Outdoors, location information measured by the GPS serves as a reference location. The database is built in a form of a location of a transmitter for each RF signal or intensity formation of various RF signals at each point, by recording the location information together with an RF signal intensity by the GPS at each point while a data collector moves with a vehicle, and by integrally processing the data.

Since the location recognition by the GPS is impossible indoors, the reference location should be input manually. For example, the data collector collects data by displaying its location on an indoor map, and measuring and recording an RF signal, by itself. Necessary data can be automatically collected in an outdoor area where a GPS signal is received while a data collector moves with a vehicle, so that a database can be built within a relatively short time. However, since a reference location should be manually input in an area such as an indoor area where the GPS signal is not received, costs, such as time, manpower, etc., greatly increase for building of the database. Further, since location-based services provided in the indoor area rather than the outdoor area requires relatively accurate location information, data should be collected with respect to denser points within a service area, so that costs increase more. As a new RF signal is added, an existing RF signal is removed, or the location is changed, with a passing of time, the RF signal information requires continuous maintenance, so that costs continuously increase.

SUMMARY

The present invention has been made to address at least the above-mentioned problems and/or disadvantages and to provide at least the advantages described below. Accordingly, an aspect of the present invention is to provide a method, in which a preparatory period and costs of an indoor location-based service can be dramatically reduced by automating the building of the RF signal database even in an area where the GPS signal cannot be received.

Another aspect of the present invention is to provide an indoor location-based service, which can be commercialized faster by reducing costs and time by automating building and maintenance of an RF signal database.

Another aspect of the present invention is to provide a method, in which costs of database maintenance can be also reduced according to an RF signal changed over time.

In accordance with an aspect of the present invention, a method of implementing a location-based service within a building is provided. The method includes receiving, from at least one electronic device, a plurality of data sets indicating information of wireless signals which the at least one electronic device measures for each time or for each location within the building; determining a similarity between the plurality of data sets; generating a logical path by integrating similar data sets; and generating a wireless signal map within the building by mapping the logical path to a physical path of the building.

In accordance with another aspect of the present invention, a non-transitory machine-readable storage medium for storing a program for executing a method of implementing a location-based service within a building is provided. The method includes receiving, from at least one electronic device, a plurality of data sets indicating information of wireless signals which the at least one electronic device measures for each time or for each location within the building; determining a similarity between the plurality of data sets; generating a logical path by integrating similar data sets; and generating a wireless signal map within the building by mapping the logical path to a physical path of the building.

In accordance with another aspect of the present invention, a server comprising a non-transitory machine-readable storage medium for storing a program for executing a method of implementing a location-based service within a building is provided. The method includes receiving, from at least one electronic device, a plurality of data sets indicating information of wireless signals which the at least one electronic device measures for each time or for each location within the building; determining a similarity between the plurality of data sets; generating a logical path by integrating similar data sets; and generating a wireless signal map within the building by mapping the logical path to a physical path of the building.

In accordance with another aspect of the present invention, a method of implementing a location-based service within a building is provided. The method includes generating at least one data set indicating information of wireless signals measured for each time or for each location within the building; transmitting a positioning request message including the at least one data set, to a server; receiving, from the server, location information of the electronic device; and providing a service based on the location information to a user.

In accordance with another aspect of the present invention, a non-transitory machine-readable storage medium for storing a program for executing a method of implementing a location-based service within a building is provided. The method includes generating at least one data set indicating information of wireless signals measured for each time or for each location within the building; transmitting a positioning request message including the at least one data set, to a server;

receiving, from the server, location information of the electronic device; and providing a service based on the location information to a user.

In accordance with another aspect of the present invention, an electronic device comprising a non-transitory machine-readable storage medium for storing a program for executing a method of implementing a location-based service within a building is provided. The method includes generating at least one data set indicating information of wireless signals measured for each time or for each location within the building; transmitting a positioning request message including the at least one data set, to a server; receiving, from the server, location information of the electronic device; and providing a service based on the location information to a user.

In accordance with another aspect of the present invention, an electronic device for implementing a location-based service within a building is provided. The electronic device includes a communication unit configured to detect wireless signals and to perform data communication; a display unit configured to display a screen; a controller configured to generate at least one data set indicating information of wireless signals measured for each time or for each location within the building through the communication unit, to request data for calculating a location of the electronic device from the server through the communication unit, to receive the data for calculating the location of the electronic device from the server through the communication unit, to calculate the location of the electronic device based on the received data, and to provide a service based on the calculated location to a user through the display unit.

BRIEF DESCRIPTION OF THE DRAWINGS

The above and other aspects, features, and advantages of the present invention will be more apparent from the following detailed description taken in conjunction with the accompanying drawings, in which.

Throughout the drawings, like reference numerals will be understood to refer to like parts, components, and structures.

DETAILED DESCRIPTION OF EMBODIMENTS OF THE PRESENT INVENTION

Figure 1:
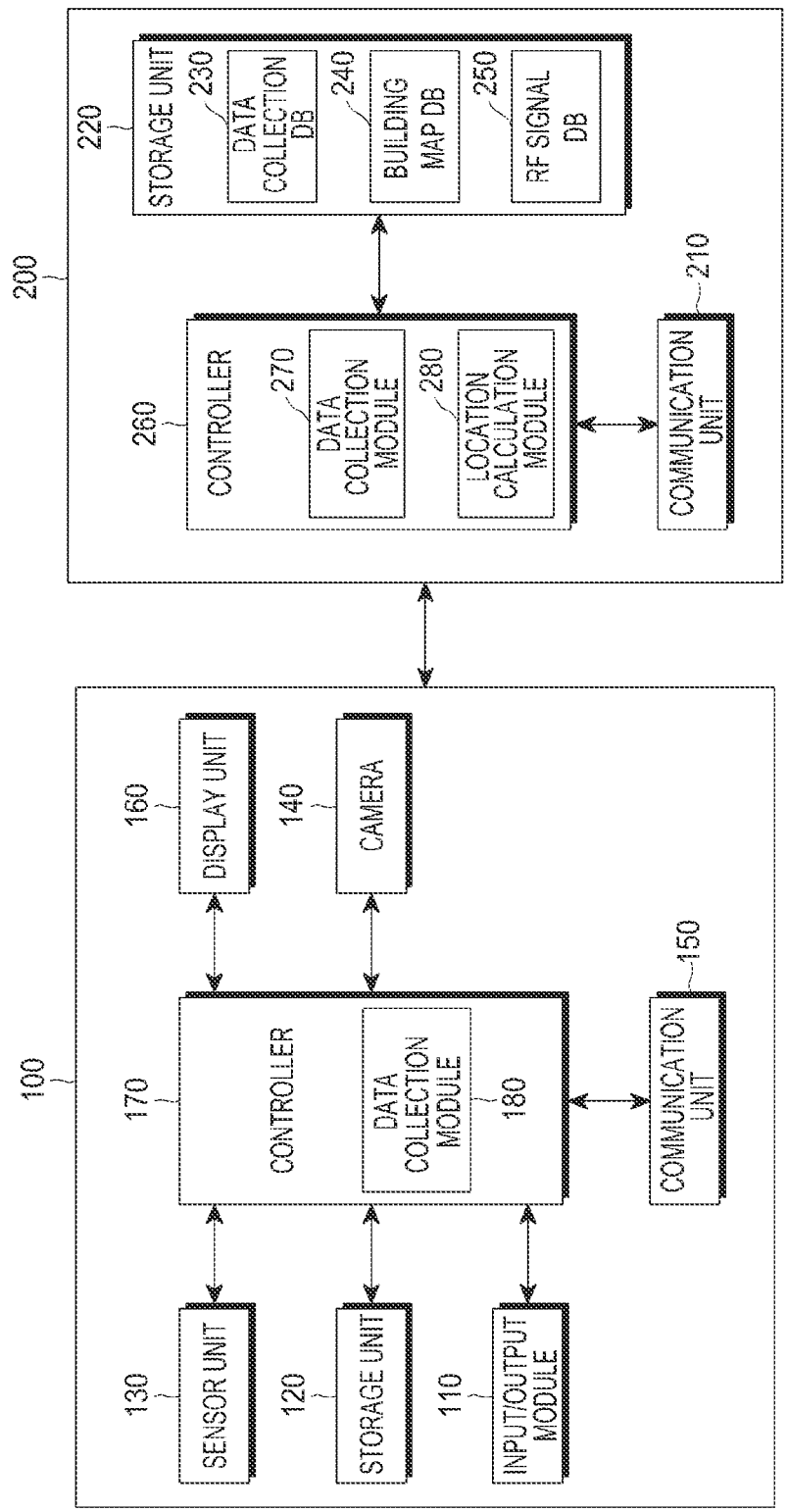
FIG. 1 illustrates a block diagram illustrating a positioning system according to an embodiment of the present invention.

The present invention may have various modifications and various embodiments, among which specific embodiments will now be described more fully with reference to the accompanying drawings. However, it should be understood that there is no intent to limit the present invention to the specific embodiments, but on the contrary, the present invention covers all modifications, equivalents, and alternatives falling within the scope of the invention.

Although the terms including an ordinal number such as first, second, etc. can be used for describing various elements, the elements are not restricted by the terms. The terms are only used to distinguish one element from another element. For example, without departing from the scope of the present invention, a first structural element may be referred to as a second structural element. Similarly, the second structural element also may be referred to as the first structural element. As used herein, the term "and/or" includes any and all combinations of one or more of the associated listed items.

The terms used in this application are for the purpose of describing particular embodiments only and are not intended to limit the invention. Singular forms are intended to include plural forms unless the context clearly indicates otherwise. In the description, it should be understood that the terms "include" or "have" indicate existences of a feature, a number, a step, an operation, a structural element, a part, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as understood by a person skilled in the art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

The electronic device of the present invention may be a certain device, and may be referred to as a portable device, a mobile terminal, a communication terminal, a portable communication terminal, a portable and mobile terminal, and so on.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display unit.

A representative structure of the electronic device refers to a portable device, and some structural elements of the representative structure of the electronic device may be omitted or changed if necessary.

FIG. 1 illustrates a block diagram illustrating a positioning system according to an embodiment of the present invention. The positioning system includes an electronic device 100 and a server 200.

The electronic device 100 is connected with the server 200 by using a first communication unit 150 or an input/output module 110. The server 200 performs a positioning function, and the server 200 corresponds to a predetermined server configured to perform a positioning function, such as a cloud server, a web server, a database server, or the like.

The electronic device 100 includes the input/output module 110, a first storage unit 120, a sensor unit 130, a camera 140, the first communication unit 150, a display unit 160, and a first controller 170.

The electronic device 100 performs an operation through communication with an external electronic device such as the server 200 or in conjunction with the external electronic device. For example, the electronic device 100 transmits an image photographed by the camera 140 and/or location information detected by the sensor unit 130, to the server through a network. The network includes at least one of a Local Area Network (LAN), a Wireless Local Area Network (WLAN), a Wide Area Network (WAN), an Internet, and a Small Area Network (SAN) although the network is not limited thereto.

The electronic device 100 corresponds to a predetermined device having a navigation function, and the electronic device 100 corresponds to a smart phone, a mobile phone, a navigation device, a game console, a display device, a head unit for a vehicle, a notebook, a laptop, a tablet, a PC, a PMP, a PDA, or the like. The electronic device 100 may be implemented as a portable communication terminal having a wireless communication function.

The input/output module 110 corresponds to a means for receiving a user's input or informing a user of information, and includes a plurality of buttons, a microphone, a speaker, a vibration motor, a connector, a keypad, and/or the like. As an example of the input/output module 110, a cursor control, such as a mouse, a trackball, a joystick, or cursor arrow keys, is provided for communication with the first controller 170 and a cursor movement control on the display unit 160, although the input/output module 100 is not limited thereto.

The button is formed on a front surface, lateral surfaces or a rear surface of the electronic device 100, and the electronic device 100 may include a power/lock button, a volume button, a menu button, a home button, a back button, a search button, and/or the like.

The microphone receives a voice or sound to generate an electrical signal under a control of the first controller 170.

The speaker outputs sounds corresponding to various signals (e.g., a wireless signal, a broadcasting signal, a digital audio file, a digital video file, photographing, etc.) to the outside of the electronic device 100 under the control of the first controller 170. The speaker outputs a sound corresponding to a function performed by the electronic device 100. One or more speakers may be formed at a proper position or proper positions of the electronic device 100.

The vibration motor converts an electrical signal into a mechanical vibration under the control of the first controller 170. For example, when the electronic device 100 in a vibration mode receives a voice call from another electronic device, the vibration motor operates. One or more vibration motors may be formed within the electronic device 100. The vibration motor operates in response to a user's touch motion that touches the display unit 160 and successive motions of a touch on the display unit 190.

A connector is employed as an interface for connecting the electronic device 100 with the server, the external electronic device or a power source. Data stored in the first storage unit 120 of the electronic device 100 is transmitted to an external apparatus or received from the external apparatus through a wired cable connected to the connector under the control of the first controller 170. Through the wired cable connected to the connector, electric power can be fed from the power source or a battery can be charged.

The keypad receives a key input from a user for a control of the electronic device 100. The keypad includes a physical keypad formed in the electronic device 100 and a virtual keypad displayed on the display unit 160.

The sensor unit 130 includes at least one sensor which detects a state (e.g., a location, an orientation, a movement, or the like) of the electronic device 100. For example, the sensor module 130 includes a proximity sensor which detects whether the user approaches the electronic device 100, a motion/orientation sensor which detects the operation of the electronic device 100 (e.g., rotation, acceleration, deceleration, vibration, or the like of the electronic device 100), etc. The motion/orientation sensor may also include an acceleration sensor (or a gravity sensor) which measures an inclination and detects a change in a linear velocity, a gyro sensor which detects an angular velocity, an impact sensor, a GPS sensor, a compass sensor (or a terrestrial magnetism sensor) which detects an orientation, an inertial sensor which detects an inertial force of a movement so as to provide various pieces of information, such as an acceleration, a velocity, a direction, a distance, etc., of a moving object which is a target of the measurement, etc. The sensor unit 130 detects a state of the electronic device 100, and generates a signal corresponding to the detection to transmit the generated signal to the first controller 170. For example, the GPS sensor receives radio waves from a plurality of GPS satellites in the Earth's orbit, and calculates a GPS location of the electronic device 100 by using a time of arrival of the radio waves from the GPS satellites to the electronic device 100. The compass sensor detects a posture or an orientation of the electronic device 100.

The first communication unit 150 corresponds to a wired or wireless communication unit provided for direct connection with the server or the external electronic device or connection through a network, wiredly or wirelessly transmit data received from the first controller 170, the first storage unit 120, the camera 140, or the like, and wiredly or wirelessly receive data from an external communication line or the air to transmit the data to the first controller 170 or to store the data in the first storage unit 120.

The first communication module 150 includes at least one of a mobile communication module, a wireless LAN module, and a short-range communication module. The first communication module 150 includes an Integrated Service Digital Network (ISDN) card, a MOdulator/DEModulator (MODEM), a Local Area Network (LAN) card, an infrared port, a Bluetooth port, a Zigbee port, a wireless port, and/or the like.

The mobile communication module connects the electronic device 100 to the external apparatus through mobile communication by using one or more antennas under the control of the first controller 170. The mobile communication module transmit/receive an RF signal for data exchange such as voice call, video call, a Short Message Service (SMS) or a Multimedia Message Service (MMS), or one-way transmission/reception with a portable phone, a smart phone, a tablet PC or other apparatuses which have a phone number or a network address input to the portable terminal 100.

The wireless LAN module is connected to the Internet in a place where a wireless Access Point (AP) is installed, under the control of the first controller 170. The wireless LAN module supports the wireless LAN provision (IEEE802.11x) of the Institute of American Electrical and Electronics Engineers (IEEE). The short-range communication module wirelessly performs short-range communication between the electronic device 100 and an image forming apparatus under the control of the first controller 170. The short-range communication scheme includes Bluetooth, Infrared Data Association (IrDA) communication, or the like.

The camera 140 includes a lens system, a driving unit and an image sensor, and may further include a flashlight, etc. The camera 140 converts an optical signal input (or photographed) through the lens system into an electronic image signal or data and outputs the converted electronic image signal or the converted data, and a user can photograph a moving image or a still image through the camera 140. In other words, the camera 140 forms an optical image of a subject and detects the formed optical image as an electronic signal.

The lens system converges light entered from the outside, so as to form the image of the subject. The lens system includes one or more lenses, and each lens may be a convex lens, an aspheric lens, etc. The lens system has a symmetric property with respect to an optical axis passing through a center thereof, and the optical axis is defined as such a central axis. The image sensor detects an optical image formed by external light entered through the lens system, and generates an electric image signal.

The image sensor includes a plurality of pixels disposed in an M×N matrix structure, and the pixels includes a photodiode and at least one transistor. The pixels accumulate electric charge generated by the incident light (that is, an exposure process), and a voltage by the accumulated electric charge indicates an illuminance of the incident light (that is, an image data output process). In processing an image constituting a still image or a moving image, image data output from the image sensor is configured by aggregation of voltages (that is, pixel values) output from the pixels, and the image data indicates one image (that is, a still image). Further, the image is configured by M×N pixels. A Charge-Coupled Device (CCD) image sensor, a Complementary Metal-Oxide Semiconductor (CMOS) image sensor, or the like, may be employed as the image sensor.

The driving unit operates the image sensor under the control of the first controller 170. The driving unit exposes all the pixels or the pixels in an interested area of all the pixels, of the image sensor, according to a control signal received from the first controller 170. The image data output from the pixels is output to the first controller 170.

The first controller 170 processes the image input from the camera 140 or the image stored in the first storage unit 120 in a unit of a frame, and outputs the converted image frame in accordance with screen characteristics (e.g., a size, an image quality, a resolution, etc.) of the display unit 160.

The display unit 160 displays the image input from the first controller 170 on a screen. A Liquid Crystal Display (LCD), a touch screen, or the like, may be employed as the display unit 160. The display unit displays the image under the control of the first controller 170, generates a key contact interrupt when a user input means, such as a finger, a stylus pen, etc., is in contact with a surface thereof, and outputs user input information including input coordinates and an input state to the first controller 170 under the control of the first controller 170.

The display unit 160 provides a Graphical User Interface (GUI) corresponding to various services (e.g., a phone call, data transmission, broadcasting and still image/moving image photographing) to the user. The display unit 160 transmits, to the first controller 170, user input information corresponding to at least one touch input to the GUI. The display unit 160 receives at least one touch through body parts of a user (e.g., fingers) or a touchable input means (e.g., a stylus pen). Further, the display unit 160 receives a continuous movement of one touch among the at least one touch. The display unit 160 transmits, to the first controller 170, user input information corresponding to the continuous movement of the input touch.

In the present invention, the touch is not limited to the contact between the display unit 160 and the user's body or the touchable input means, and may include noncontact (e.g., a touchable interval between a touch screen and the user's body or the touchable input means is less than or equal to 1 centimeter). The display unit 160 corresponds to a touch screen, and may be implemented in, for example, a resistive type, a capacitive type, an infrared type, or an acoustic wave type.

The first storage unit 120 stores applications having various functions, such as a navigation, a video call, a game, etc., images for providing the GUIs related to the applications, user information, documents, information/data/databases related to a method of implementing a location-based service, background images (e.g., a menu screen, a standby screen, etc.) or operating programs needed for operating the electronic device 100, images photographed by the camera, and/or the like. The first storage unit 120 corresponds to a machine-readable medium (for example, a computer-readable medium), and the term "machine-readable medium" may be defined as a medium for providing data to the machine to perform a specific function. The machine-readable medium may be a storage medium. The first storage unit 120 may include a non-volatile medium and a volatile medium. All of these media should be of a type which allows commands transferred by the media to be detected by a physical mechanism through which the machine reads the commands.

The machine-readable storage medium includes at least one of a floppy disk, a flexible disk, a hard disk, a magnetic tape, a Compact Disc Read-Only Memory (CD-ROM), an optical disk, a punch card, a paper tape, a Random Access Memory (RAM), a Programmable Read-Only Memory (PROM), an Erasable PROM (EPROM), and a Flash-EPROM although the machine-readable storage medium is not limited thereto.

The first controller 170 executes an application according to the user input information, and the application performs a program operation according to the user input information. At this time, the user input includes an input through the input/output module 110, the display unit 160, the sensor unit 130, or the like. or an input based on the camera. The first controller 170 includes a bus for information communication, and a processor connected with the bus for information processing. The first controller 170 also includes a RAM connected with the bus in order to store information required by the processor. The RAM is used to store temporal information required by the processor. The electric device 100 further includes a ROM connected with the bus in order to store static information required by the processor. The first controller 170 serves to control an overall operation of the electronic device as a central processing unit, and performs a method of implementing or providing a Location-Based Service (LBS) according to the present invention.

Figure 2:
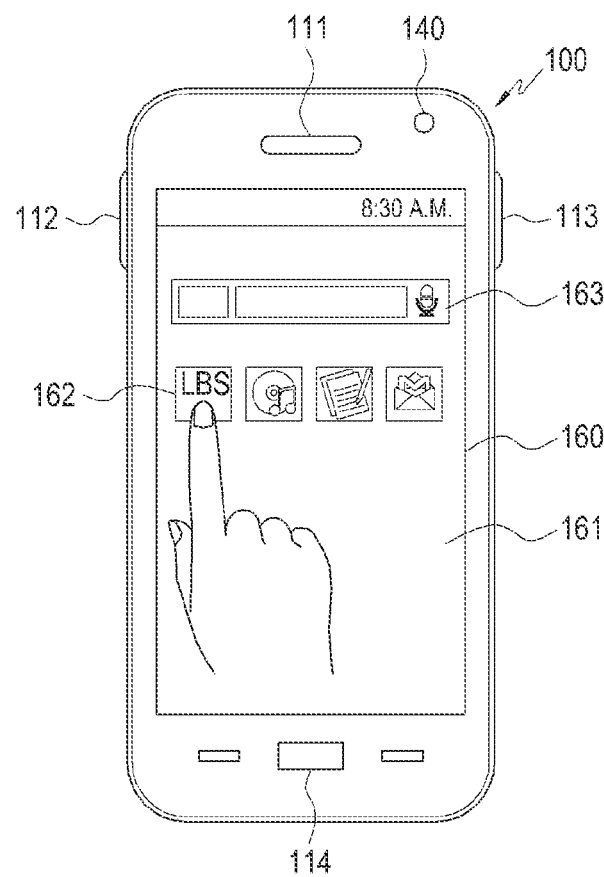
FIG. 2 illustrates an outer appearance of an electronic device according to an embodiment of the present invention.

FIG. 2 illustrates an outer appearance of an electronic device according to an embodiment of the present invention.

FIG. 2 illustrates the display unit 160 disposed on a front surface of the electronic device 100, a speaker 111 and the camera 140 disposed at an upper portion of the electronic device 100, and a home button 114 disposed at a lower portion of the electronic device 100. A volume button 112 is disposed at one side surface of the electronic device 100, and a power button 113 is provided at an opposite side surface of the electronic device 100.

The first storage unit 120 of the electronic device 100 stores an LBS application 162 and a voice recognition application 163, and the electronic device 100 displays applications (e.g., a navigation application, a memo application, the LBS application 162, the voice recognition application 163, etc.) as executable icons on a screen 161 of the display unit 160. When the LBS application 162 is executed according to the user's input, the electronic device 100 performs the method of implementing or providing the location-based service. The first controller 170 can detect various user inputs received through the camera 140, the input/output module 110, the sensor unit 130, and the like, in addition to the display unit 160. The user input includes various types of information input into the electronic device 100, such as a gesture, a voice, a pupil action, a bio signal, etc., of the user in addition to the touch. The first controller 170 controls a predetermined operation or function corresponding to the detected user input to be performed within the electronic device 100.

In order to implement the location-based service, the first controller 170 of the electronic device 100 periodically or non-periodically detects peripheral RF signals, and collects information of the detected RF signals. The first controller 170 transmits the collected RF signal information to the server 200. The first controller 170 periodically transmits the RF signal information to the server 200 or periodically accesses the server 200. If a predetermined condition, such as a transmission request, a user transmission command, termination of the LBS application 162, or the like, is satisfied, the first controller 170 transmits the collected RF signal information to the server 200. A data processing module 270 of a second controller 260 of the server 200 receives the RF signal information from a plurality of electronic devices to store the RF signal information in a data collection DB 230, and generates or updates an RF signal map by mapping map information of a building map DB 240 and the RF signal information. Further, the server 200 stores the generated RF signal map in an RF signal DB 250.

In order to provide the location-based service, the first controller 170 of the electronic device 100 requests, from the server 200, location-related data for the location-based service, receives, from the server 200, the location-related data corresponding to the request, and provides the location-based service by using the received data.

Hereinafter, although an indoor space of a building is used as an example, the present invention can be applied to an outdoor space.

Figure 3:
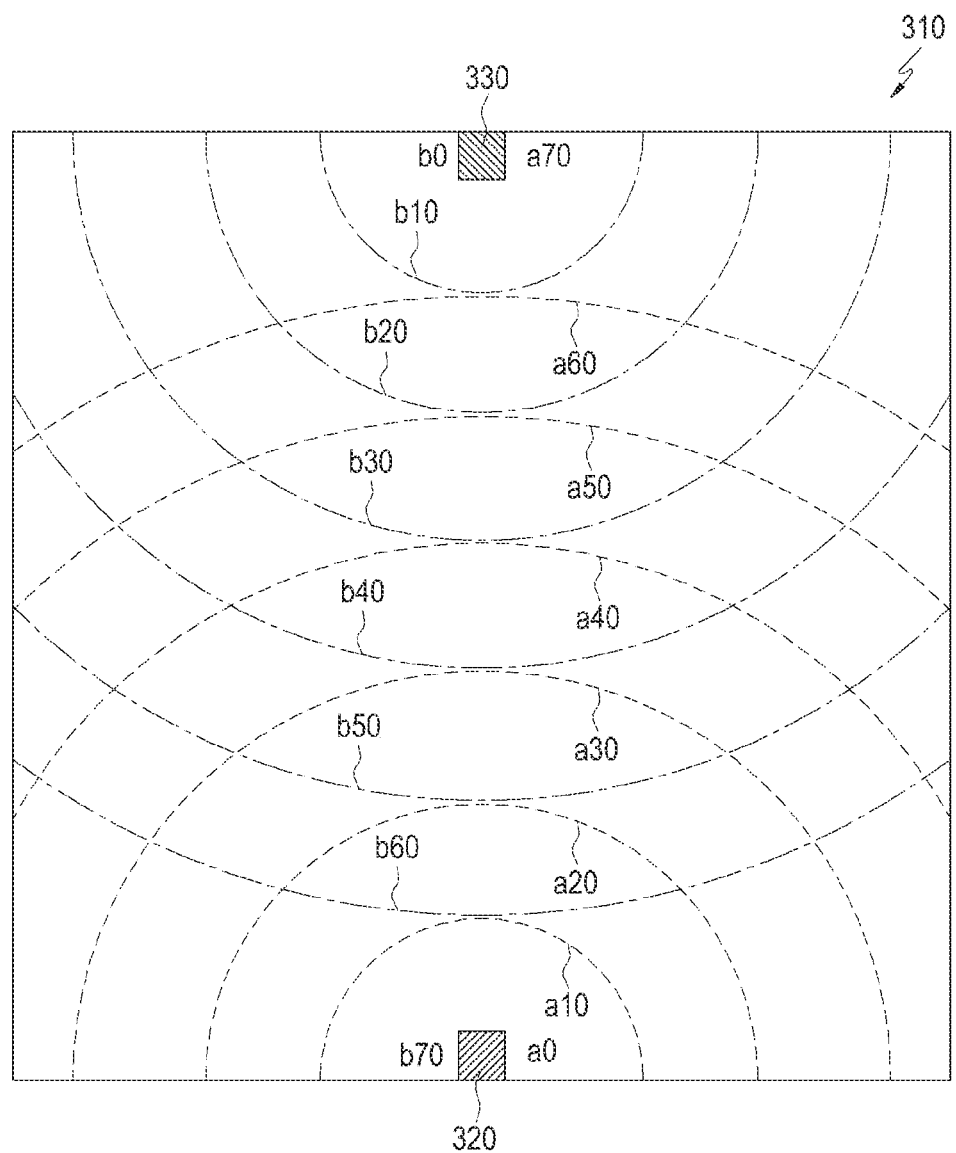
FIG. 3 illustrates wireless signal intensity distribution in an indoor space.

FIG. 3 illustrates wireless signal intensity distribution in the indoor space.

When a first RF signal transmitter 320 and a second RF signal transmitter 330 are disposed in an indoor space 310, RF signal distribution in the indoor space 310 is illustrated in FIG. 3. When the electronic device 100 receives an RF signal, a reception intensity of a first RF signal output from the first RF signal transmitter 320 is decreased as the electronic device 100 becomes farther away from the first RF signal transmitter 320 (i.e., a0→a10→a20→a30→a40→a50→a60→a70). Likewise, a reception intensity of a second RF signal output from the second RF signal transmitter 330 is deceased as the electronic device 100 becomes farther away from the second RF signal transmitter 330 (i.e., b0→b10→20→30→40→50→60→70).

When the RF signal distribution in the indoor space 310 is known, the electronic device 100 calculates a location of the electronic device 100 within the indoor space 310, through a type and an intensity of the received RF signal.

Figure 4:
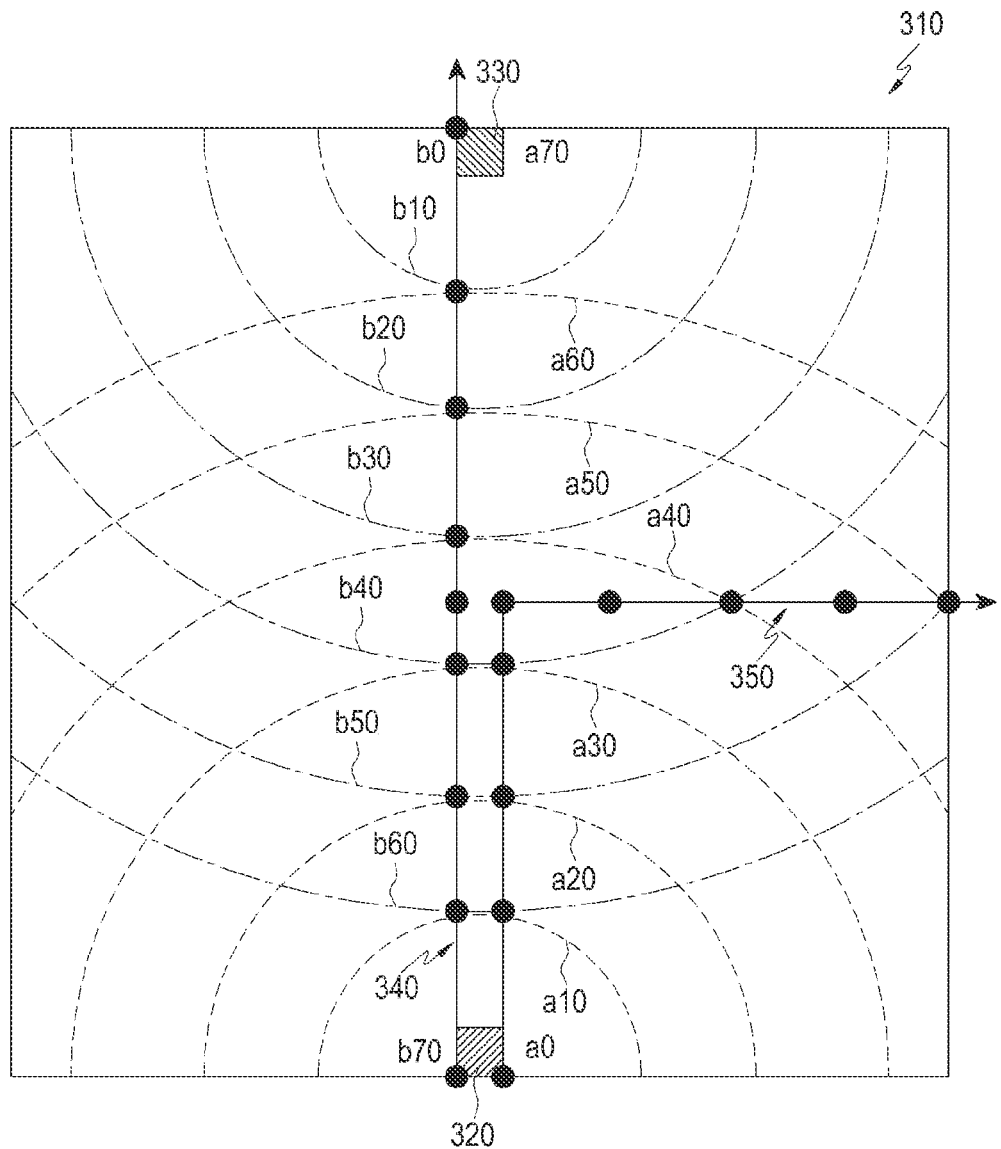
FIG. 4 illustrates a moving path including a signal measurement location of electronic devices.

FIG. 4 illustrates a moving path including a signal measurement location of electronic devices.

Referring to FIG. 4, a first electronic device of a first user moves along a first path 340 and a second electronic device of a second user moves along a second path 350. At this time, the first and second electronic devices have the same configuration as that of the electronic device illustrated in FIG. 1. Locations where the first and second electronic devices measure or detect the RF signals are displayed on the paths 340 and 350 in a solid circle point.

Figure 5A:
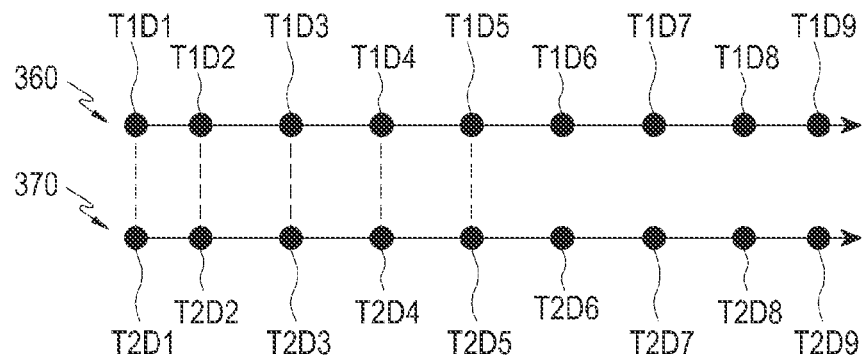
FIGS. 5A to 5C illustrates trace data of a moving path including a signal measurement location of electronic devices.
Figure 5B:
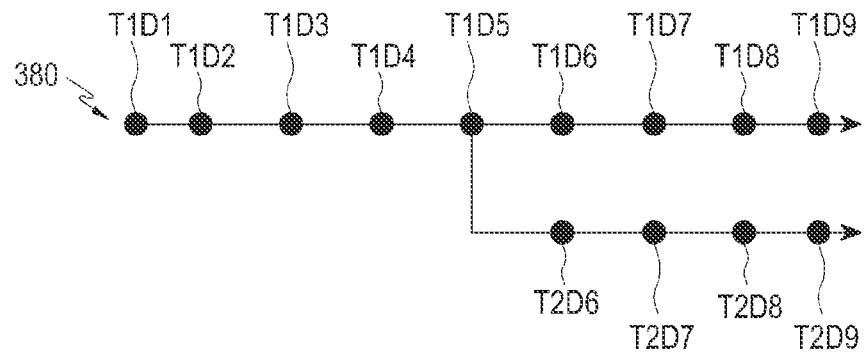
Figure 5C:
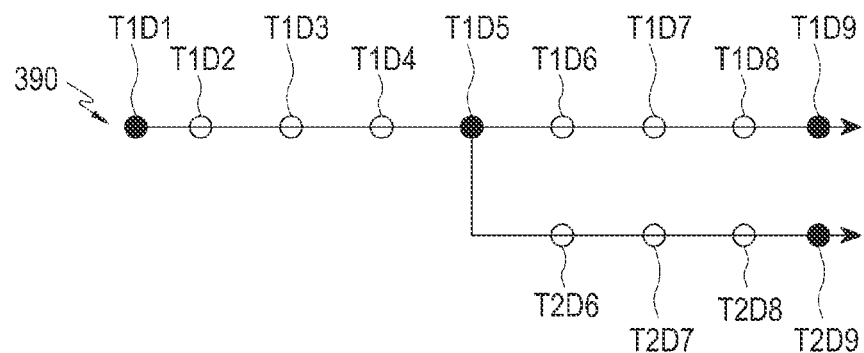

FIGS. 5A to 5C illustrate trace data of a moving path including a signal measurement location of electronic devices.

Referring to FIG. 5A, the first electronic device periodically or non-periodically detects peripheral RF signals, and collects information of the detected RF signals. The information of the RF signals for each time (or for each location in the indoor space 310), collected by the first electronic device, configures first trace data 360.

The second electronic device periodically or non-periodically detects peripheral signals, and collects information of the detected RF signals. The information of the RF signals for each time (or for each location in the indoor space 310), collected by the second electronic device, configures second trace data 370.

Each of the trace data 360 and 370 is configured by a plurality of data sets indicating information of the RF signals for each time, and each data set is displayed on a time axis displayed as an arrow, in a solid circle point.

For example, the data set is expressed in a form of {an intensity of the first RF signal, an intensity of the second RF signal}.

The server 200 receives the first trace data from the first electronic device, and receives the second trace data from the second electronic device.

For example, the first trace data may be configured by data sets of T1D1(={a0, b70}), T1D2(={a10, b60}), T1D3(={a20, b50}), T1D4(={a30, b40}), T1D5(={a35, b35}), T1D6(={a40, b30}), T1D7(={a50, b20}), T1D8(={a60, b10}), T1D9(={a70, b0}), and the second trace data may be configured by data sets of T2D1(={a0, b70}), T2D2(={a10, b60}), T2D3(={a20, b50}), T2D4(={a30, b40}), T2D5(={a35, b35}), T2D6(={a37, b33}), T2D7(={a40, b40}), T2D8(={a45, b45}), T2D9(={a50, b50}).

The server 200 compares the data sets of the first trace data 360 with the data sets of the second trace data 370, and integrates similar data sets having a difference within a predetermined threshold value into one data set. For example, the predetermined threshold value of the intensity difference is set to 2 dB. For example, when similarity between T1D2 (={a10, b60}) and T2D2(={a10, b60}) is determined, it can be determined whether conditions of |a10-a10|≤2 dB and |b60-b60|≤2 dB is satisfied.

FIG. 5B illustrates integrated trace data of a moving path including a signal measurement location of electronic devices. In the integrated trace data, the T1D1 and the T2D1 are integrated into the T1D1, the T1D2 and the T2D2 are integrated into the T1D2, the T1D3 and the T2D3 are integrated into T1D3, the T1D4 and the T2D4 are integrated into the T1D4, and the T1D5 and the T2D5 are integrated into the T1D5. The two data sets are integrated into an average intensity value or an intensity value of one of the two data sets.

FIG. 5C illustrates trace data of a logical path in an indoor space. Such a logical path 390 has trace data in one crossing point T1D5 and first to third end points T1D1, T1D9 and T2D9. The crossing point may be referred to a branch point or a feature point.

Figure 6:
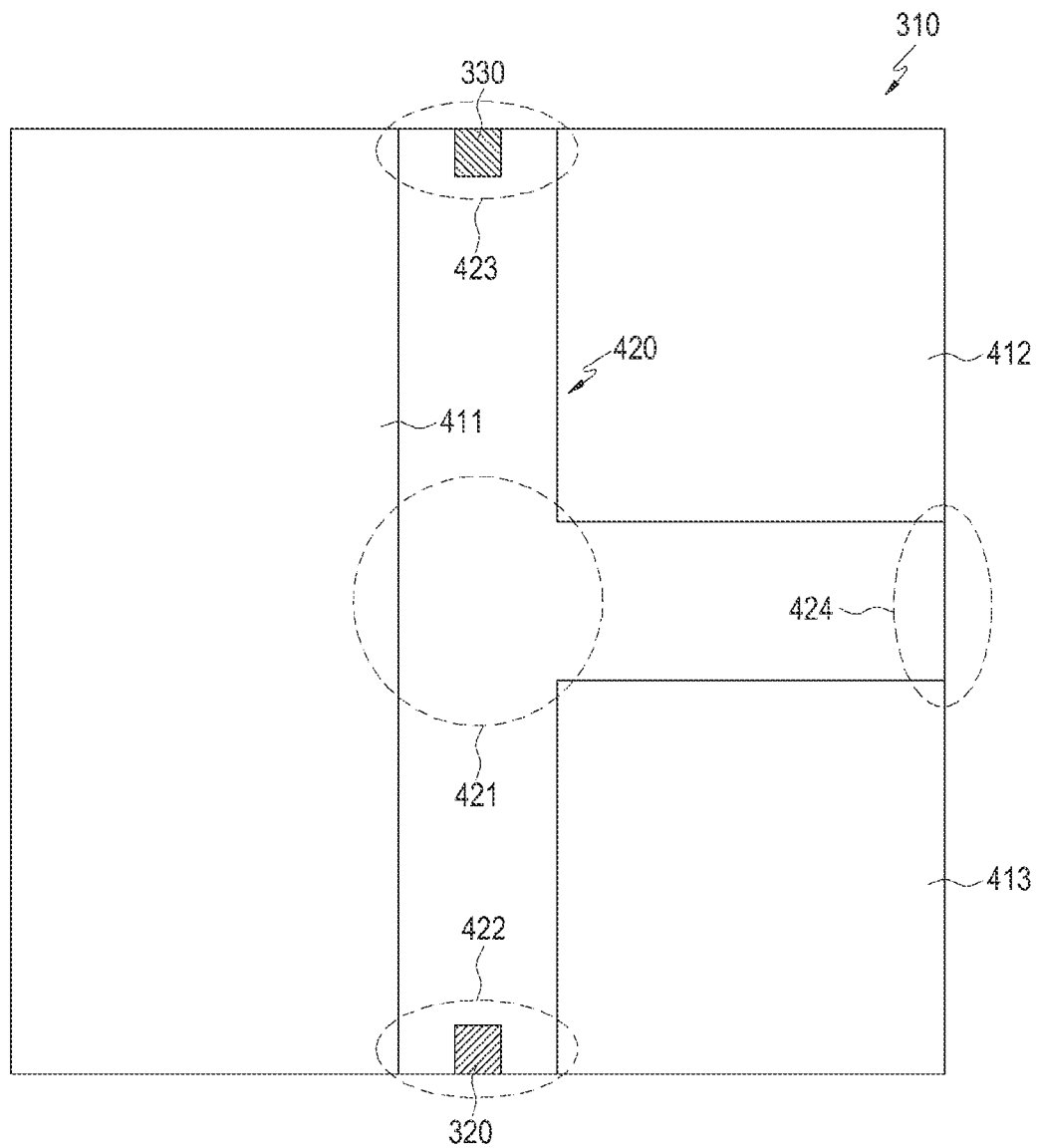
FIG. 6 illustrates a physical path in an indoor space.

FIG. 6 illustrates a physical path in an indoor space. The indoor space 310 is partitioned by at least one structure 411, 412 and 413 (e.g., a store, a room, a restroom, a lounge, etc.), and passages between the structures 411, 412 and 413 correspond to a physical path 420. The physical path 420 has one crossing location 421 and first to third entrances (or entrance locations) 422, 423 and 424.

The server 200 generates or updates an RF signal map for the indoor space 310 by mapping the logical path 390 to the physical path 420. An isomorphic graph comparison process corresponding to a well-known graph theory can be applied to the path mapping, and each of the main points (the crossing point, the end point and the intermediate point) of the logical path 390 can be mapped to each of the main locations (e.g., a store, a room, a restroom, a lounge, a passage, etc.) of the physical path 420 through the isomorphism graph comparison process. For example, the server 200 uses GPS location information of the electronic device 100 included in other information of the trace data, location information of the first and second RF signal transmitters 320 and 330 stored in a second storage unit 220 of the server 200, and/or the like, in order to map the first to third end points T1D1, T1D9 and T2D9 to the first to third entrances 422, 423 and 424. For example, the GPS location information shortly before a user of the first electronic device enters the indoor space is used for mapping the first entrance 422 to the first end point T1D1, and the GPS location information immediately after the user of the first electronic device leaves the indoor space is used for mapping the second entrance 423 to the second end point T1D9.

Figure 7:
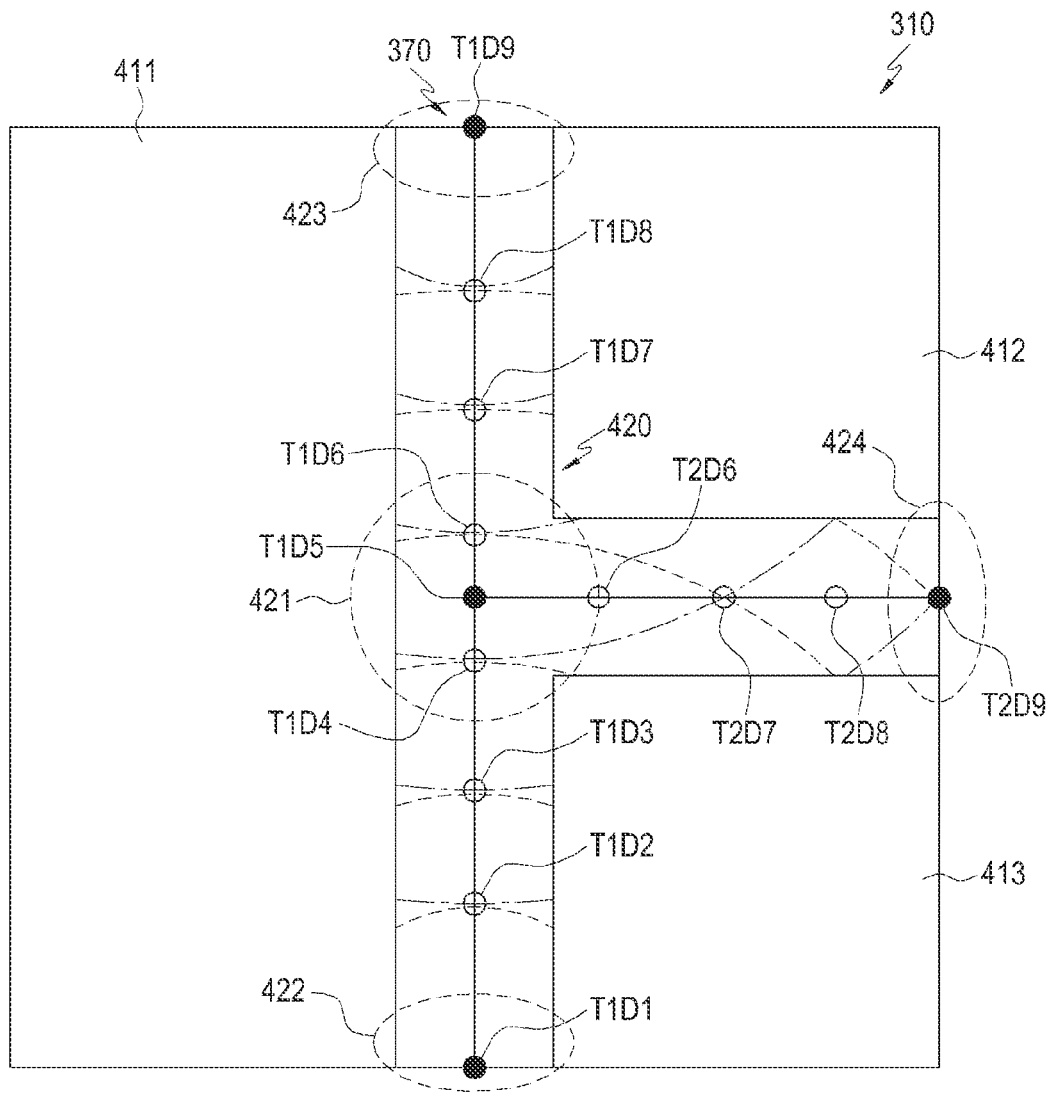
FIG. 7 illustrates an RF signal map.

FIG. 7 illustrates an RF signal map for an indoor space, which is obtained by mapping the logical path to the physical path. The RF signal map is configured by a plurality of data sets, and each data set is expressed as {a location (or coordinates), an intensity of a first RF signal, an intensity of a second RF signal}, for example, {a x coordinate, a y coordinate, an intensity of a first RF signal, an intensity of a second RF signal}. For example, when coordinates of the crossing point 421 and the first to third entrances 422, 423 and 424 in the physical path 420 are {x1, y1}, {x2, y2}, {×3, y3} and {x4, y4}, respectively, the RF signal map includes data sets of {x1, y1, a35, b35}, {x2, y2, a0, b70}, {×3, y3, a70, b0} and {x4, y4, a50, b50}.

Hereinafter, although the method of implementing the location-based service and the method of providing the location-based service are separately described for the convenience of understanding, the two methods can be implemented together and called the method of implementing the location-based service.

Figure 8:
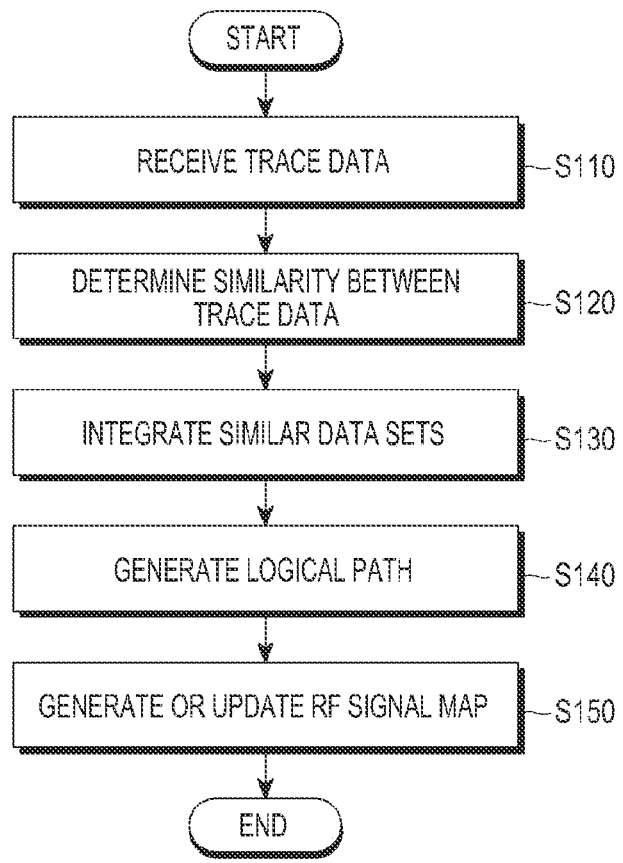
FIG. 8 is a flowchart illustrating a method of implementing a location-based service according to an embodiment of the present invention.

FIG. 8 is a flowchart illustrating a method of implementing a location-based service according to an embodiment of the present invention. The following steps are performed by the data processing module 270 of the second controller 260 of the server 200.

Step S110 corresponds to a step of receiving trace data. In step S110, the server 200 receives a plurality of pieces of the trace data from a plurality of electronic devices. The plurality of electronic devices have the same configuration as that of the electronic device illustrated in FIG. 1.

The first controller 170 of each electronic device periodically or non-periodically measures and detects peripheral RF signals, and a data collection module 180 of the first controller 170 collects information of the detected RF signals. The data collection module 180 generates a data set for each measurement time (or each measurement location), generates trace data configured by a plurality of data sets, and transmits the generated trace data or the generated data set to the server 200. That is, each electronic device transmits the generated data set to the server 200 whenever the data set is generated, or transmits the plurality of data sets collected at predetermined time intervals or at predetermined distance intervals, to the server 200.

Step S120 corresponds to an operation of determining a similarity between the plurality of pieces of trace data. In step S120, the server 200 compares data sets of the plurality of pieces of trace data with each other. At this time, each data set of each trace data is compared with each data set of the other trace data. The server 200 detects the data sets which have a difference within a predetermined threshold value and are similar to each other.

Step S130 corresponds to an operation of integrating the similar data sets. In step S130, the server 200 integrates the data sets of the plurality of pieces of trace data, which have a difference within a predetermined threshold value and are similar to each other, into a singular data set.

Step S140 corresponds to an operation of generating a logical path. In step S140, the server 200 generates the logical path based on the plurality of pieces of the trace data which are integrated mutually and partially.

Step S150 corresponds to an operation of generating or updating an RF signal map. In step S150, the server generates or updates the RF signal map for the indoor space by mapping the logical path to a physical path.

FIG. 9 illustrates an example of trace data.

Figure 9A:
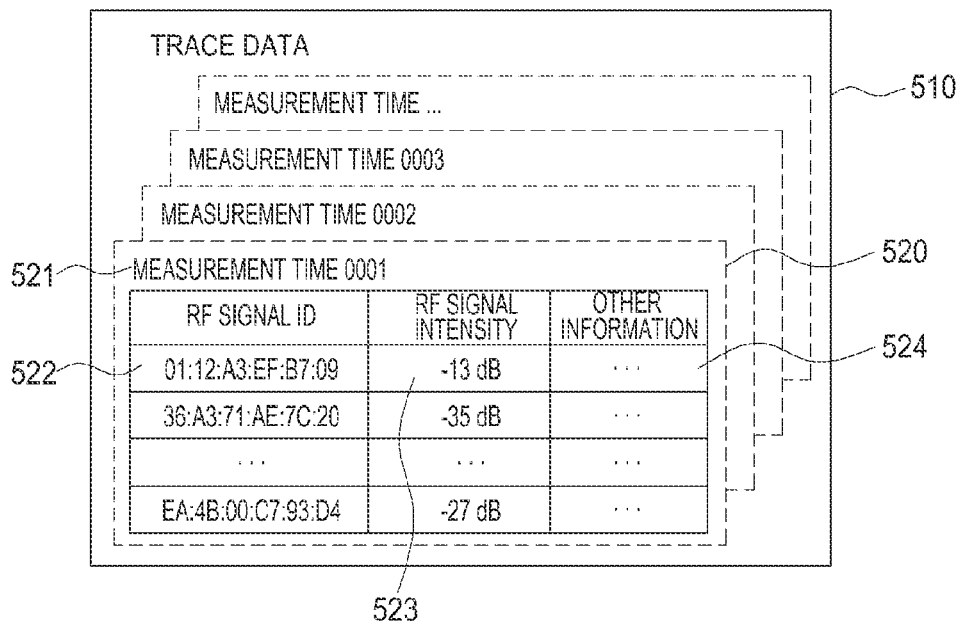
FIGS. 9A and 9B illustrates examples of trace data.

Referring to FIG. 9A, the trace data 510 is configured by a plurality of data sets 520, which are classified for each measurement time, and each of the data sets 520 includes a measurement time 521, an RF signal ID(s) 522, an RF signal intensity value(s) 523, and other information 524 (or additional information). The RF signal ID refers to a wireless signal identifier.

The measurement time 521 corresponds to time information for every time point when the electronic device collects data. The measurement time 521 may be absolute time information for the Coordinated Universal Time or Universal Time Coordinated (UTC) or the like, or relative time information by which sequential relation of the data can be merely identified.

The RF signal ID(s) 522 corresponds to identification information or an identifier which can identify an RF signal being received at every time. When a Wi-Fi signal is collected, a Media Access Control (MAC) address of a Wi-Fi signal transmitter or an RF signal transmitter can be the identifier. When a mobile communication signal or a cellular signal is collected, a cell ID can be the identifier.

The RF signal intensity implies an intensity or a strength of the RF signal of the corresponding ID.

The other information 524 includes state information (e.g., location, orientation, movement, and/or the like) of the electronic device 100, which is detected by the sensor unit 130, and/or various pieces of information, such as an electronic device ID, or the like, which are stored in the electronic device 100 or measured by the electronic device 100.

The electronic device ID corresponds to information by which the server 200 can identify and recognize the electronic device which has actually measured and collected the data. The electronic device ID includes a model name, various pieces of version information, or the like, of the electronic device 100, and/or a communication identifier such as a phone number, a network ID, and/or the like.

Figure 9B:
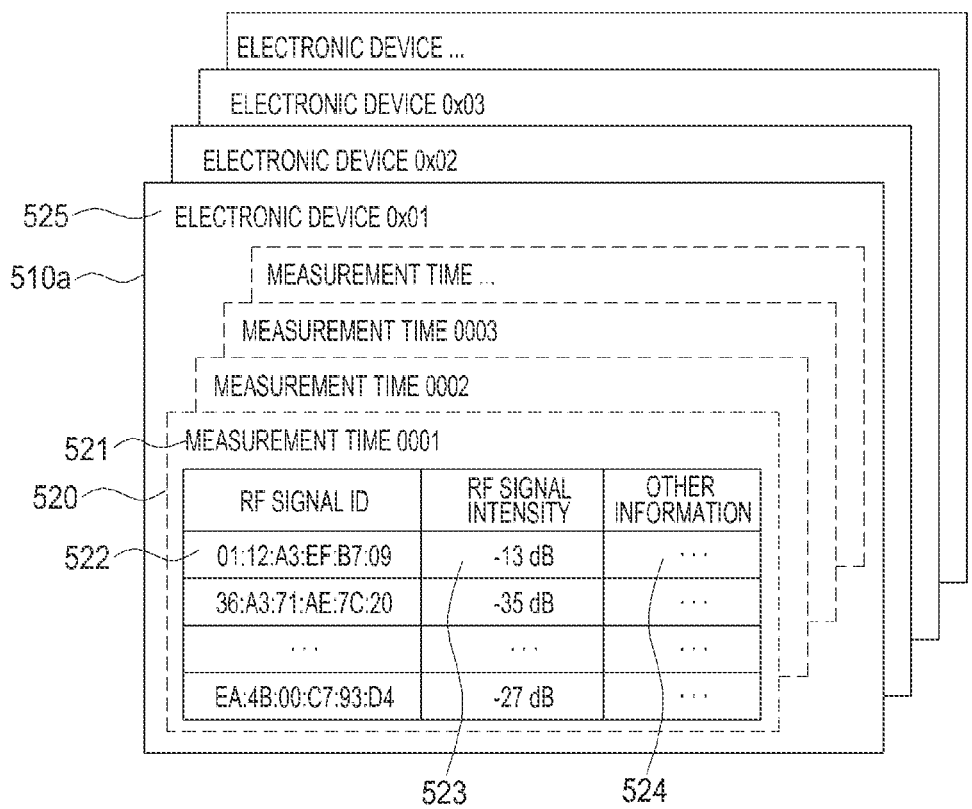

FIG. 9B illustrates an example of trace data stored in the data collection DB 230. The server 200 receives trace data 510a from a plurality of electronic devices by using a second communication unit 210, and stores the received trace data 510a in the data collection DB 230.

The server 200 classifies the trace data 510a with respect to each electronic device ID 525 and stores the classified trace data 510a, or assigns a predetermined identification index to each trace data when the electronic device IDs cannot be received from the electronic devices for reasons of privacy, etc.

FIGS. 10A to 10B, 11A to 11B, and 12A to 12B illustrate processes of generating an RF signal map.

Figure 10A:
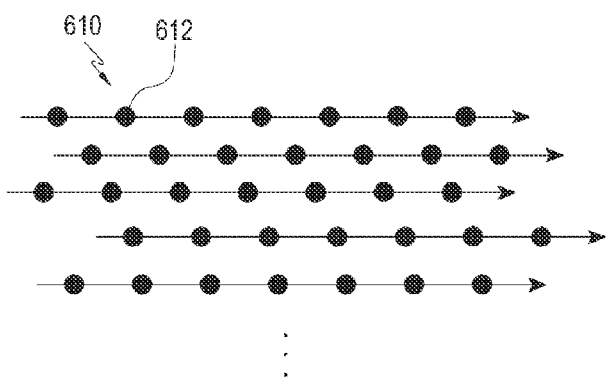
FIGS. 10A to 10B, 11A to 11B, and 12A to 12B illustrate processes of generating an RF signal map.

FIG. 10A illustrates a plurality of pieces of trace data which the server 200 receives from the plurality of electronic devices. Each trace data 610 includes a plurality of data sets 612. Each data set 612 is displayed on a time axis displayed as an arrow, in a solid circle point.

Figure 10B:
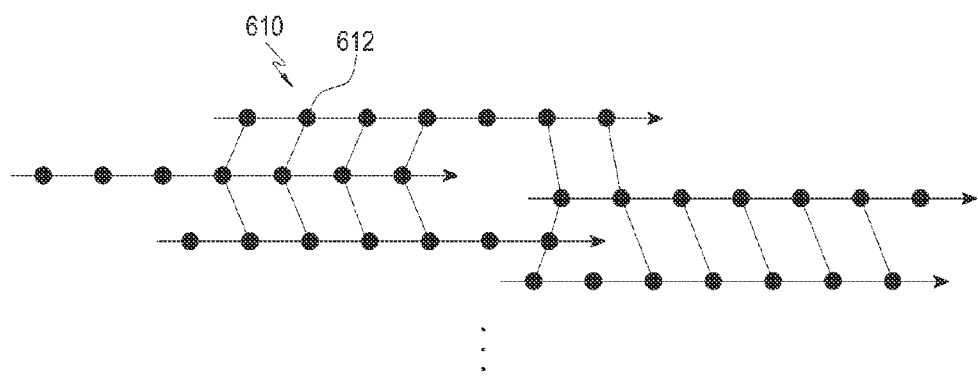

FIG. 10B illustrates that the data sets, which are detected by the server 200 and are similar to each other, are connected with each other.

In determining the similarity between the data sets, the server 200 uses various algorithms. A data set collected at a location of an indoor space includes an RF signal ID and an RF signal intensity. When it is assumed that a data set 1-1 of first trace data and a data set 2-4 of second trace data are measured at adjacent locations in the indoor space, it is likely that the data set 1-1 and the data set 2-4 include information of RF signals having the same ID. When the number of the common RF signals is N, two N-dimensional vectors having N RF signal intensities as elements are configured.

The RF signal intensity vector of the common RF signals of the data set 1-1: $S(T1,1)=<S\_T1\_1\_i>$, $i=1\sim N$ The RF signal intensity vector of the common RF signals of the data set 2-4: $S(T2,4)=<S\_T2\_4\_i>$, $i=1\sim N$ The similarity between the data set 1-1 and the data set 2-4 can be determined using various distance calculation methods such as the Euclidean distance, the Manhattan distance, and the like, of the two RF signal intensity vectors. When a distance between the two data sets (that is, a difference between the two data sets) is within a threshold value, the server 200 determines that the two data sets are similar to each other.

For example, the Euclidean distance between the two RF signal vectors is calculated as follows in Equation (1):

$$\text{Euclidean Distance} = \sqrt{\sum_{i=1}^{N} (S\_T1\_1\_i - S\_T2\_4\_i)^2} \quad (1)$$

Figure 11A:
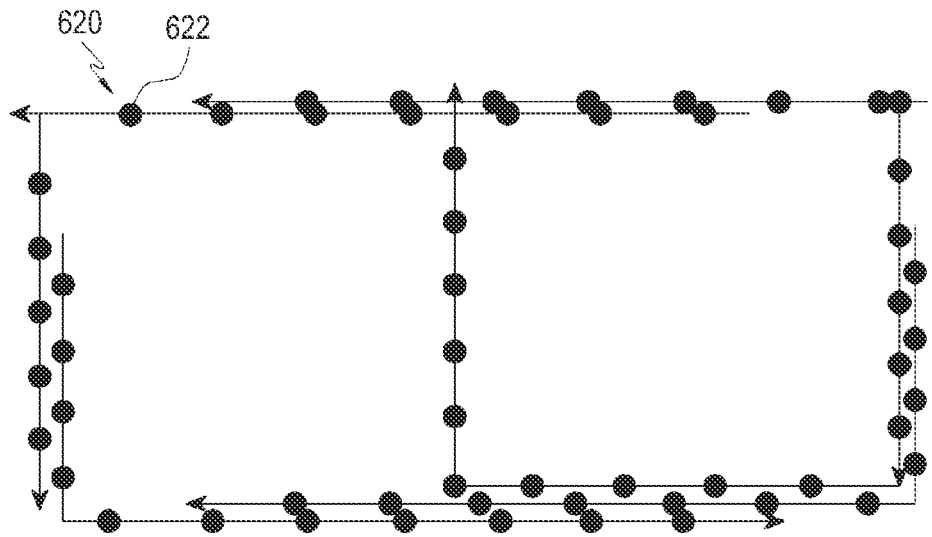

FIG. 11A geometrically illustrates a plurality of pieces of trace data to be mutually and partially integrated, in an overlapping state. In FIG. 11A, a plurality of pieces of trace data 620 are disposed such that similar data sets 622 to be integrated are located adjacent to each other.

Figure 11B:
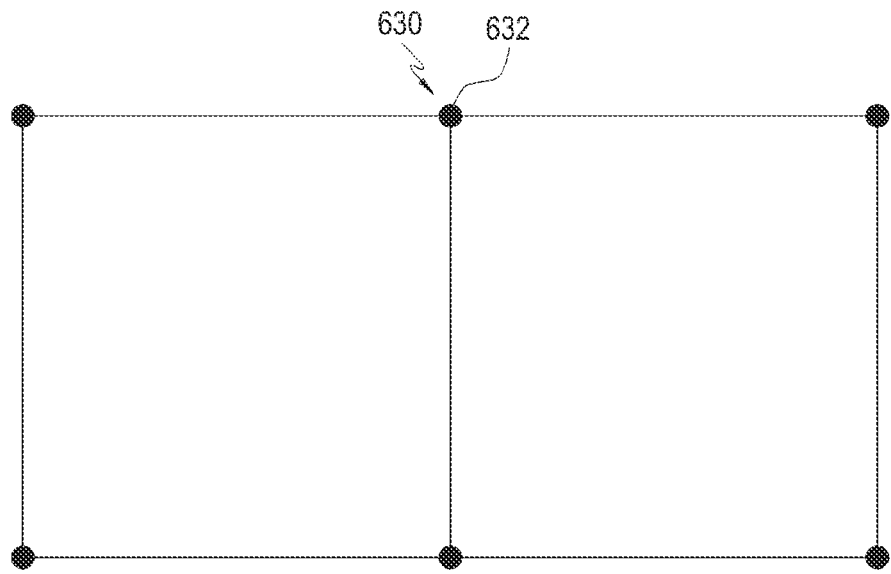

FIG. 11B illustrates a logical path within an indoor space, which is identified by the plurality of pieces of trace data which are partially integrated. Such a logical path 630 has six crossing points 632.

Figure 12A:
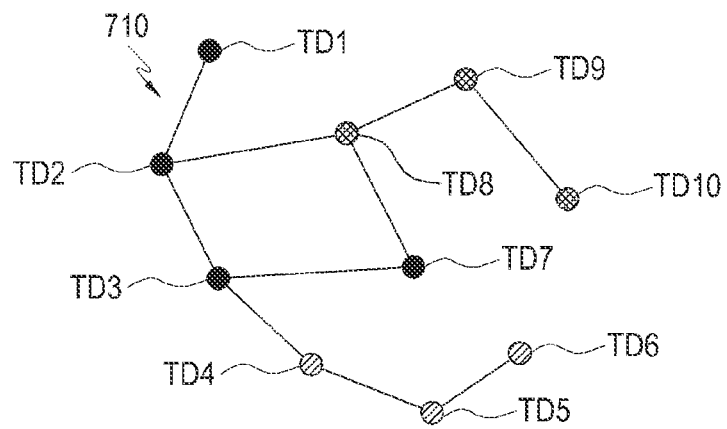

Referring to FIG. 12A, a logical path 710 is configured by first to tenth data sets TD1, TD2, TD3, TD4, TD5, TD6, TD7, TD8, TD9 and TD10, and the logical path 710 has first to fourth crossing points TD2, TD3, TD7 and TD8 and first to third end points TD1, TD6 and TD10.

Figure 12B:
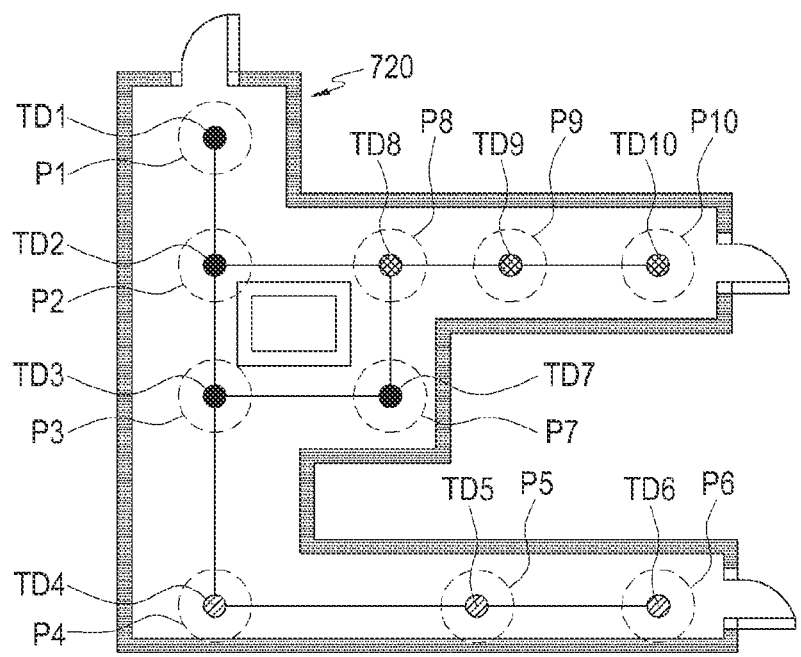

Referring to FIG. 12B, a physical path 722 in an indoor space 720 has first to fourth crossing locations P2, P3, P7 and P8 and first to third entrances (or entrance locations) P1, P6 and P10.

The server 200 uses the building map DB 240 in order to convert the logical path 710 logically coinciding with the physical path 722 in the indoor space 720 into a path physically coinciding with a direction and a length of the actual physical path 722. The physical path 722 is stored in the building map DB 240. An isomorphic graph comparison process corresponding to a well-known graphic theory can be applied to the path conversion or the mapping, and each main point of the logical path 710 can be mapped to each main location of the physical path 722 through the isomorphic graph comparison process.

The server 200 maps the first to tenth data sets TD1, TD2, TD3, TD4, TD5, TD6, TD7, TD8, TD9 and TD10, which are the main points of the logical path 710, to the first to tenth points P1, P2, P3, P4, P5, P6, P7, P8, P9, P10, which are the main locations of the physical path 722.

As described above, the other information of the trace data may include state information (e.g., location, orientation, movement, and/or the like) of the electronic device 100, and various pieces of information such as an electronic device ID, etc., which are stored in the electronic device 100. Further, the electronic device acquires, information on whether the electronic device 100 moves or not, movement distance information, or movement speed information of the electronic device 100, by using a measurement value of the acceleration sensor of the sensor unit 130. The electronic device 100 provides movement distance information from a previous data set to the server 200 as other or additional information for each data set of the trace data.

The server 200 determines how far away physical locations of adjacent data sets within the trace data are, by using the other information, and more exactly processes the integration of the plurality of pieces of the trace data and the mapping of the logical path and the physical path, by using the information.

Further, the electronic device 100 acquires the movement direction information of the electronic device by using measurement values of the gyro sensor, the compass sensor, and/or the like, of the sensor unit 130. The electronic device 100 provides movement direction information from a previous data set to the server 200 as other or additional information for each data set of the trace data.

The server 200 determines which direction the physical locations of the adjacent data sets within the trace data are connected in, by using the other information, and more exactly processes the mapping of the logical path and the physical path, by using the information.

Further, the electronic device 100 acquires the location information of the electronic device by using a measurement value of the GPS sensor of the sensor unit 130, in an outdoor space. The electronic device 100 provides, to the server 200, the GPS location information as other or additional information for a part of the data sets of the trace data.

The server 200 collects the trace which continuously moves in the indoor space and the outdoor space in the vicinity of the building entrance, identifies the absolute location of the building entrance by using the GPS location information, and more exactly processes the mapping of the logical path and the physical path by using the information.

Figure 13:
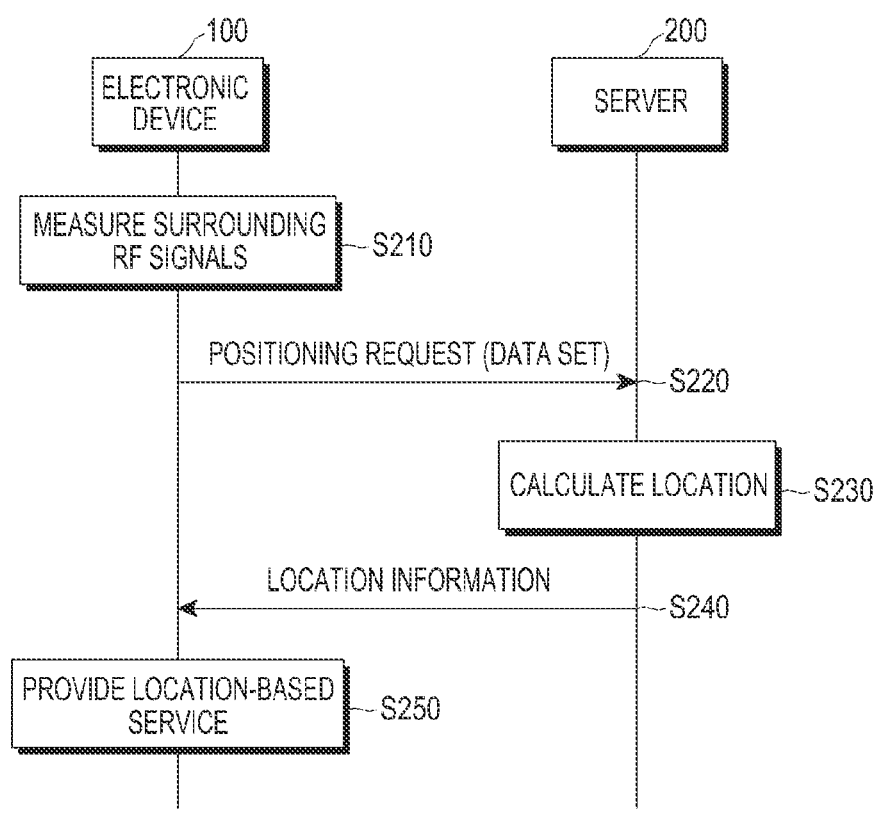
FIG. 13 is a signal flow diagram illustrating a method of providing a location-based service according to an embodiment of the present invention.

FIG. 13 is a signal flow diagram illustrating a method of providing a location-based service according to an embodiment of the present invention.

Step S210 corresponds to an operation of measuring surrounding RF signals. In step S210, the electronic device 100 periodically or non-periodically detects the surrounding RF signals according to a request of the server 200, automatic setting, or a request of a user, and collects information of the detected RF signals.

Step S220 corresponds to an operation of requesting positioning. In step S220, the electronic device 100 requests location data of the electronic device 100, from the server 200. The electronic device includes a first data set indicating the RF signal information measured at the current time or the current location or trace data having the first data, in the positioning request message, and transmits the positioning request message to the server 200.

Step S230 corresponds to an operation of calculating a location. In step S230, a location calculation module 280 of the server 200 calculates a location of the electronic device 100 within the indoor space (or the building) based on the first data set received from the electronic device and the RF signal map stored in the RF signal DB 250. For example, the location calculation module 280 searches the RF signal map for a second data set having an RF signal intensity corresponding to an RF signal intensity of, and extracts location information of the searched second data set (i.e., a location value or coordinate values of the second data set). Further, when the second data set coinciding with the first data set cannot be found, the location calculation module 280 calculates, as a location of the electronic device 100 within the indoor space, a location between locations (i.e., location values or coordinate values of adjacent data sets) within the adjacent data sets having RF signal intensities similar to an RF signal intensity of the first data set.

For example, referring back to FIG. 7, when the first data sets include RF signal intensities of {a5, b65} and the adjacent data sets detected in the RF signal map are {x5, y5, a0, b70} and {x6, y6, a10, b60}, the location calculation module 280 calculates a location of {(x5+y5)/2, (x6+y6)/2} as the location of the electronic device within the indoor space.

Further, the data processing module 270 of the second controller 260 of the server 200 stores the first data set received from the electronic device 100, in the data collection DB 230, and uses the first data set in order to update the RF signal map.

Step S240 corresponds to an operation of transmitting location information. In step S240, the second controller 260 of the server 200 transmits the calculated location information of the electronic device 100 to the electronic device 100 through the second communication unit 210. The first controller of the electronic device 100 receives the location information from the server 200 through the first communication unit 150.

Step S250 corresponds to an operation of providing a location-based service. In step S250, the first controller 170 of the electronic device 100 provides a service based on the received location information, to a user of the electronic device 100.

Such a location-based service may correspond to providing the building map (or the indoor space map of the building) and the current location information on the building map, providing the building map and the location guidance information (or the navigation information), providing the building map and the location information or the location guidance information of the surrounding major places (e.g., a lounge, a toilet, a store, an information desk, etc.), or the like.

Figure 14:
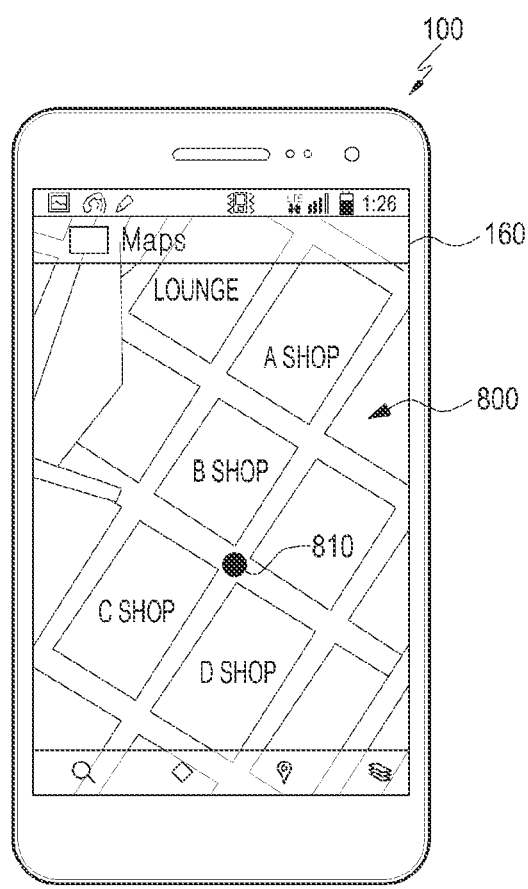
FIG. 14 illustrates an example of a location-based service.

FIG. 14 illustrates an example of a location-based service. A map application screen 800, a current location 810 of a user, and a description of the surrounding major place are provided on the display unit 160 of the electronic device 100.

Further, when a user touches a specific place on the map application screen 800 to select the specific place, guidance information (or navigation information) from the current location to the selected place or a detailed description (e.g., a phone number, event guidance, etc.) of the selected place is displayed on the display unit.

Figure 15:
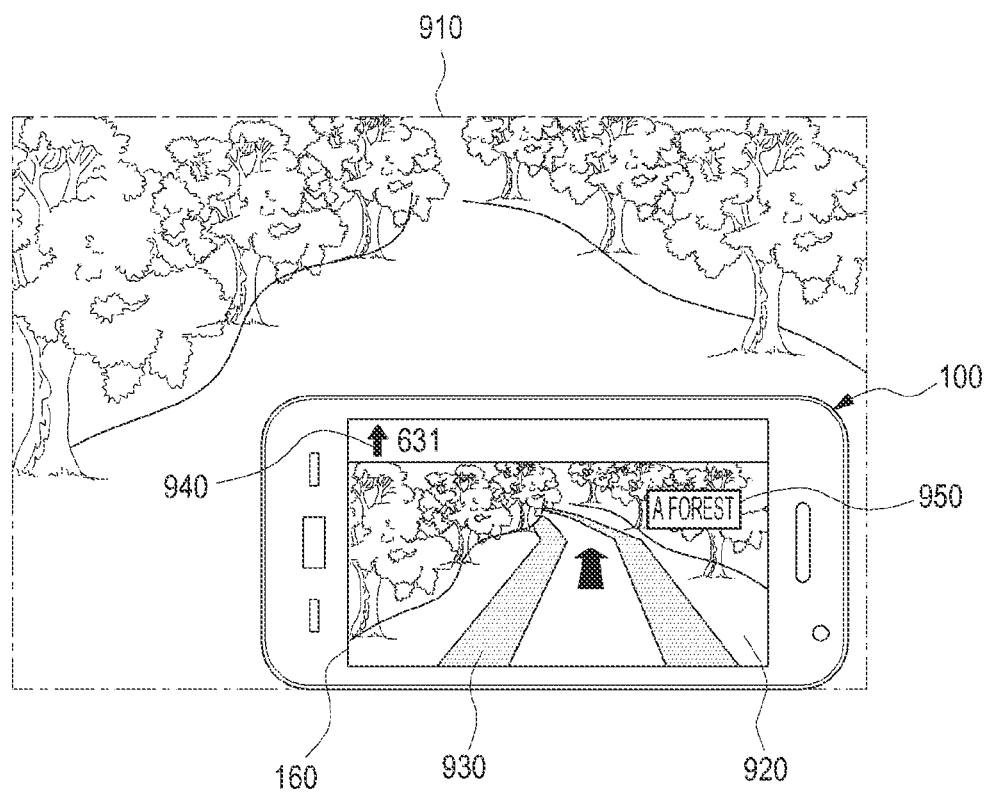
FIG. 15 illustrates another example of a location-based service.

FIG. 15 illustrates another example of a location-based service. Referring to FIG. 15, a user is located at a forest A within an indoor amusement park, and the electronic device 100 provides the location guidance information to a forest B requested by the user.

An image 920 of a surrounding environment 910 currently photographed by the camera 140 and the location guidance information overlapped on the surrounding environment image 920 are displayed on the display unit 160 of the electronic device 100. The location guidance information includes a first location guidance object 930 displaying a progress path in a form of an image while overlapping a road within the surrounding environment image 920, a second location guidance object 940 displaying a progress direction in a crossroad and a distance from a current location to the crossroad while overlapping an upper portion of the surrounding environment image 920, and a Point Of Interest (POI) object 950 displaying detailed information, such as a name, or the like, of a major place, such as a building, a road, or the like, in the surrounding environment image 920. At this time, the POI object may be displayed in a form of a text, an image, or the like.

Meanwhile, the display unit 160 corresponds to a transparent display unit passing through a light of a background at a rear side thereof, and the display unit 160 of the electronic device 100 displays not an image photographed by the camera 140 but the actual surrounding environment 910.

Figure 16:
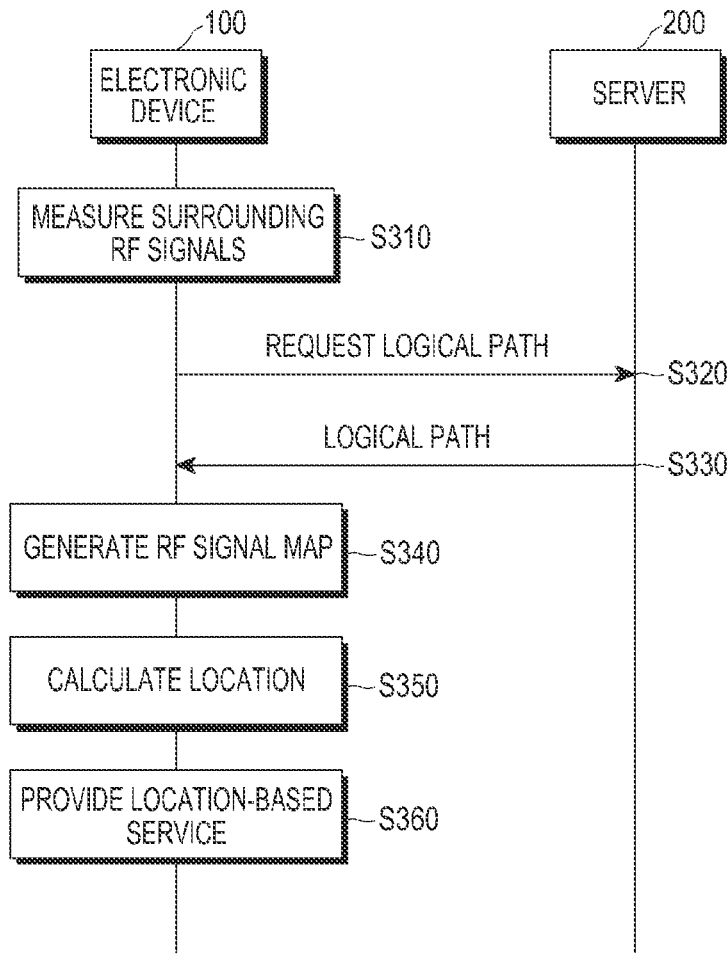
FIG. 16 is a signal flow diagram illustrating a method of providing a location-based service according to another embodiment of the present invention.

FIG. 16 is a signal flow diagram illustrating a method of providing a location-based service according to another embodiment of the present invention.

Step S310 corresponds to an operation of measuring surrounding RF signals. In step S310, the electronic device 100 periodically or non-periodically detects the surrounding RF signals according to a request of the server 200, an automatic setting, or a request of a user, and collects information of the detected RF signals (i.e., the data set).

Step S320 corresponds to an operation of requesting a logical path. In step S320, the electronic device 100 requests a logical path as data for calculating the location of the electronic device 100, from the server 200. As described with reference to FIG. 8, the server 200 generates the logical path for the indoor space by using the plurality of pieces of trace data received from the plurality of electronic devices, and stores the generated logical path in the second storage unit 220.

Step S330 corresponds an operation of receiving the logical path. In step S330, the electronic device 100 receives the logical path from the server 200.

Step S340 corresponds to an operation of generating an RF signal map. In step S340, the electronic device 100 generates the RF signal map for the indoor space by mapping the logical path received from the server 200 to a physical path for the indoor space. The physical path for the indoor space is stored in the first storage unit 120.

Although it is described in the present embodiment that the electronic device 100 requests and receives the logical path from the server 200, the electronic device may request and receive the RF signal map from the server 200.

Step S350 corresponds to an operation of calculating a location. In step S350, the electronic device 100 calculates a location of the electronic device 100 within the indoor space (or the building) based on the information of the RF signals acquired in step S310 and the RF signal map. For example, the electronic device 100 searches the RF signal map for a data set having an RF signal intensity corresponding to the information of the RF signals (i.e., an RF signal intensity), and extracts location information of the discovered data set (i.e., a location value or coordinate values of the data set). Further, when the data set coinciding with the information of the RF signals cannot be discovered, the electronic device 100 calculates, as a location of the electronic device 100 within the indoor space, a location between locations (i.e., location values or coordinate values of adjacent data sets) within the adjacent data sets similar to the information of the RF signals.

Step S360 corresponds to an operation of providing a location-based service. In step S360, the electronic device 100 provides a service based on the received location information, to a user of the electronic device 100.

In the present invention, the server refers to a server device, and a module within each controller refers to a device.

It may be appreciated that the embodiments of the present invention may be implemented in software, hardware, or a combination thereof. Such a predetermined software may be stored, for example, in a volatile or non-volatile storage device such as a ROM, etc., a memory such as a RAM, a memory chip, a memory device, an Integrated Circuit (IC), etc., or an optical or magnetic recordable and machine (e.g., computer) readable storage medium such as a Compact Disc (CD), a Digital Video Disc (DVD), a magnetic disk, a magnetic tape, etc., regardless of its ability to be erased or its ability to be re-recorded. It is appreciated that the storage unit included in the electronic device is one example of the machine-readable storage media suitable for storing a program or programs including instructions for implementing various embodiments of the present invention. Accordingly, the present invention includes a program that includes a code for implementing an apparatus or a method defined in the appended claims in the present invention and a machine-readable storage medium that stores such a program. Further, the program may be electronically transferred by a predetermined medium such as a communication signal transferred through a wired or wireless connection, and the present invention appropriately includes equivalents of the program.

Further, the electronic device can receive the program from a program providing apparatus wiredly or wirelessly connected to the device, and store the received program. The program providing device includes a program including instructions which makes the electronic device perform the method of implementing the location-based service within the building, a memory for storing information needed for the method of implementing the location-based service within the building, a communication unit for performing wired or wireless communication with the electronic device, and a controller for transmitting the corresponding program to the electronic device according the request of the electronic device or automatically.

Although specific embodiments are described in the above description of the present invention, various modifications can be made without departing from the scope of the present invention. Accordingly, the scope of the present invention shall not be determined by the above-described embodiments, and is to be determined by the following claims and their equivalents.

What is claimed is:

1. A method of implementing a location-based service within a building, the method comprising:
   implementing a location-based service within a building
   receiving, by a server, from a first electronic device, a plurality of first data sets indicating information of wireless signals which the first electronic device measures for each time or for each location within the building;
   receiving, by the server, from a second electronic device, a plurality of second data sets indicating information of wireless signals which the second electronic device measures for each time or for each location within the building;
   determining, by the server, a similarity between the plurality of first data sets representing a first moving path of the first electronic device and the plurality of second data sets representing a second moving path of the second electronic device;
   generating, by the server, a logical path by integrating similar data sets from among the plurality of first data sets and the plurality of second data sets and connecting the first moving path and the second moving path; and
   generating, by the server, a wireless signal map within the building by mapping the logical path to a physical path of the building.

2. The method of claim 1, wherein the plurality of first data sets and the plurality of second data sets comprise a plurality of wireless signal identifiers and a plurality of wireless intensity values.

3. The method of claim 2, wherein the plurality of first data sets and the plurality of second data sets further comprise measurement times of the wireless signals.

4. The method of claim 1, wherein determining the similarity comprises:
   determining whether a difference between wireless signal intensity values of the plurality of first data sets and the plurality of second data sets is within a predetermined threshold value; and
   when it is determined that the difference between the wireless signal intensity values of the plurality of first data sets and the plurality of second data sets is within the predetermined threshold value, determining that the plurality of first data sets and the plurality of second data sets are similar to each other.

5. The method of claim 1, wherein determining the similarity comprises:
   calculating wireless signal intensity vectors of the plurality of first data sets and the plurality of second data sets;
   determining whether a distance between the wireless signal intensity vectors of the plurality of first data sets and the plurality of second data sets is within a predetermined threshold value; and
   when it is determined that the distance between the wireless signal intensity vectors is within the predetermined threshold value, determining that the plurality of first data sets and the plurality of second data sets are similar to each other.

6. The method of claim 1, wherein generating the logical path comprises:
   setting wireless signal intensity values of the similar data sets to be an average value of the wireless signal intensity values or one of the wireless signal intensity values.

7. The method of claim 1, wherein generating the wireless signal map comprises setting wireless signal intensity values for each main location of the physical path.

8. The method of claim 1, further comprising:
   receiving a positioning request from a third electronic device;
   calculating location information of the third electronic device based on the wireless signal map; and
   transmitting the location information to the third electronic device.

9. A non-transitory machine-readable storage medium for storing a program for executing a method of a server for implementing a location-based service within a building, the method comprising:

receiving, by the server, from a first electronic device, a plurality of first data sets indicating information of wireless signals which the first electronic device measures for each time or for each location within the building;

receiving, by the server, from a second electronic device, a plurality of second data sets indicating information of wireless signals which the second electronic device measures for each time or for each location within the building;

determining, by the server, a similarity between the plurality of first data sets representing a first moving path of the first electronic device and the plurality of second data sets representing a second moving path of the second electronic device;

generating, by the server, a logical path by integrating similar data sets from among the plurality of first data sets and the plurality of second data sets and connecting the first moving path and the second moving path; and generating, by the server, a wireless signal map within the building by mapping the logical path to a physical path of the building.

10. The non-transitory machine-readable storage medium of claim 9, wherein the plurality of first data sets and the plurality of second data sets comprise a plurality of wireless signal identifiers and a plurality of wireless intensity values.

11. The non-transitory machine-readable storage medium of claim 9, wherein determining the similarity comprises:
    determining whether a difference between wireless signal intensity values of the plurality of first data sets and the plurality of second data sets is within a predetermined threshold value; and
    when it is determined that the difference between the wireless signal intensity values of the plurality of first data sets and the plurality of second data sets is within the predetermined threshold value, determining that the plurality of first data sets and the plurality of second data sets are similar to each other.

12. The non-transitory machine-readable storage medium of claim 9, wherein determining the similarity comprises:
    calculating wireless signal intensity vectors of the plurality of first data sets and the plurality of second data sets;
    determining whether a distance between the wireless signal intensity vectors of the plurality of first data sets and the plurality of second data sets is within a predetermined threshold value; and
    when it is determined that the distance between the wireless signal intensity vectors is within the predetermined threshold value, determining that the plurality of first data sets and the plurality of second data sets are similar to each other.

13. The non-transitory machine-readable storage medium of claim 9, wherein generating the logical path comprises:
    setting wireless signal intensity values of the similar data sets to be an average value of the wireless signal intensity values or one of the wireless signal intensity values.

14. The non-transitory machine-readable storage medium of claim 9, wherein the method further comprises:
    receiving a positioning request from a third electronic device;
    calculating location information of the third electronic device based on the wireless signal map; and
    transmitting the location information to the third electronic device.

15. A server for implementing a location-based service within a building, the server comprising:
    a communication unit configured to:
    receive, from a first electronic device, a plurality of first data sets indicating information of wireless signals which the first electronic device measures for each time or for each location within the building, and
    receive, from a second electronic device, a plurality of second data sets indicating information of wireless signals which the second electronic device measures for each time or for each location within the building; and
    a controller configured to:
    determine a similarity between the plurality of first data sets representing a first moving path of the first electronic device and the plurality of second data sets representing a second moving path of the second electronic device;
    generate a logical path by integrating similar data sets from among the plurality of first data sets and the plurality of second data sets and connecting the first moving path and the second moving path; and
    generate a wireless signal map within the building by mapping the logical path to a physical path of the building.

16. The server of claim 15, wherein the plurality of first data sets and the plurality of second data sets comprise a plurality of wireless signal identifiers and a plurality of wireless intensity values.

17. The server of claim 15, wherein the controller is configured to:
    determine whether a difference between wireless signal intensity values of the plurality of first data sets and the plurality of second data sets is within a predetermined threshold value; and
    when it is determined that the difference between the wireless signal intensity values of the plurality of first data sets and the plurality of second data sets is within the predetermined threshold value, determine that the plurality of first data sets and the plurality of second data sets are similar to each other.

18. The server of claim 15, wherein the controller is configured to:
    calculate wireless signal intensity vectors of the plurality of first data sets and the plurality of second data sets;
    determine whether a distance between the wireless signal intensity vectors of the plurality of first data sets and the plurality of second data sets is within a predetermined threshold value; and
    when it is determined that the distance between the wireless signal intensity vectors is within the predetermined threshold value, determine that the plurality of first data sets and the plurality of second data sets are similar to each other.

19. The server of claim 15, wherein the controller is configured to:
    set wireless signal intensity values of the similar data sets to be an average value of the wireless signal intensity values or one of the wireless signal intensity values.

20. The server of claim 15, wherein the controller is configured to set wireless signal intensity values for each main location of the physical path.

21. The server of claim 15, wherein the controller is configured to:
    receive a positioning request from a third electronic device;
    calculate location information of the third electronic device based on the wireless signal map; and
    transmit the location information to the third electronic device.

* * * * *